(12) United States Patent
Huang et al.

(10) Patent No.: US 7,242,502 B2
(45) Date of Patent: Jul. 10, 2007

(54) OPTICAL DEVICE OF SCANNER

(76) Inventors: Yin-Chun Huang, 6F, No.72-11, Ln.531, Sec.1, KuangFu Rd., Hsinchu (TW); Po-Hua Fang, 8F-2, No.290, Kung Yuan Rd., Hsinchu (TW)

( * ) Notice: Subject to any disclaimer, the term of this patent is extended or adjusted under 35 U.S.C. 154(b) by 311 days.

(21) Appl. No.: 10/664,936

(22) Filed: Sep. 22, 2003

(65) Prior Publication Data

US 2004/0057097 A1 Mar. 25, 2004

(30) Foreign Application Priority Data

Sep. 24, 2002 (TW) .............................. 91215035 U

(51) Int. Cl.
*H04N 1/04* (2006.01)

(52) U.S. Cl. ..................... 358/475; 358/474; 358/497

(58) Field of Classification Search ................ 358/475, 358/509, 474, 497, 483, 482, 471, 494, 473, 358/472, 512–514, 505, 506, 487, 484; 382/312, 382/313, 318, 319; 250/208.1, 216, 239, 250/234–236; 359/212; 355/67, 68
See application file for complete search history.

(56) References Cited

U.S. PATENT DOCUMENTS 5,519,513 A * 5/1996 Copenhaver et al. ....... 358/475
5,617,131 A * 4/1997 Murano et al. ............. 347/233
6,917,453 B1 * 7/2005 Onishi et al. ............... 358/483
2004/0057097 A1 * 3/2004 Huang et al. ............... 359/212
2005/0002317 A1 * 1/2005 Hakamata ................... 369/121

* cited by examiner

*Primary Examiner*—Cheukfan Lee
(74) *Attorney, Agent, or Firm*—Berkeley Law & Technology Group LLP

(57) ABSTRACT

The invention relates to a scanner's optical device, for receiving the light coming from the image of an object being scanned, comprising: several reflective mirrors, a light-focusing module, and a charge coupled device. The reflective mirrors provide reflection and directional change for the light and, by appropriately arranging several reflective mirrors, the light of the object being scanned directionally changed to a predetermined route. With at least one curving mirror, the light-focusing module focuses the light of the predetermined route and then directionally changes it, and a raster is then provided in the light route of the curving mirror for filtering out unnecessary light. The charge coupled device receives the light coming from the light-focusing module and converts it into electronic signals. The said light-focusing module replaces the prior art lens set for executing a scanning job.

18 Claims, 10 Drawing Sheets

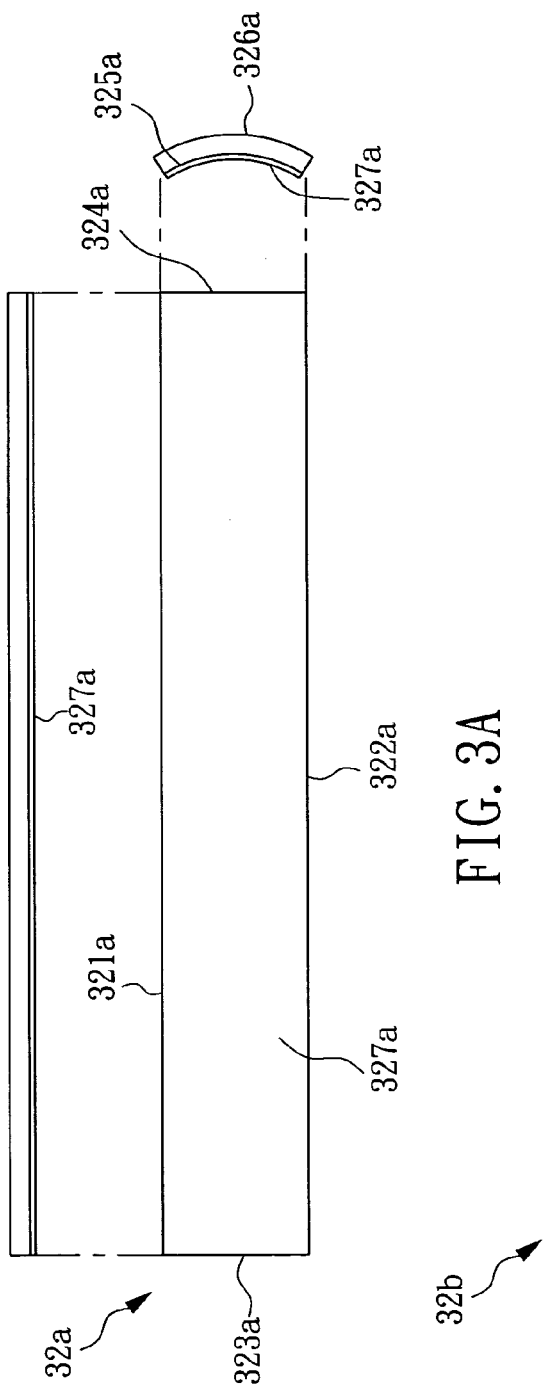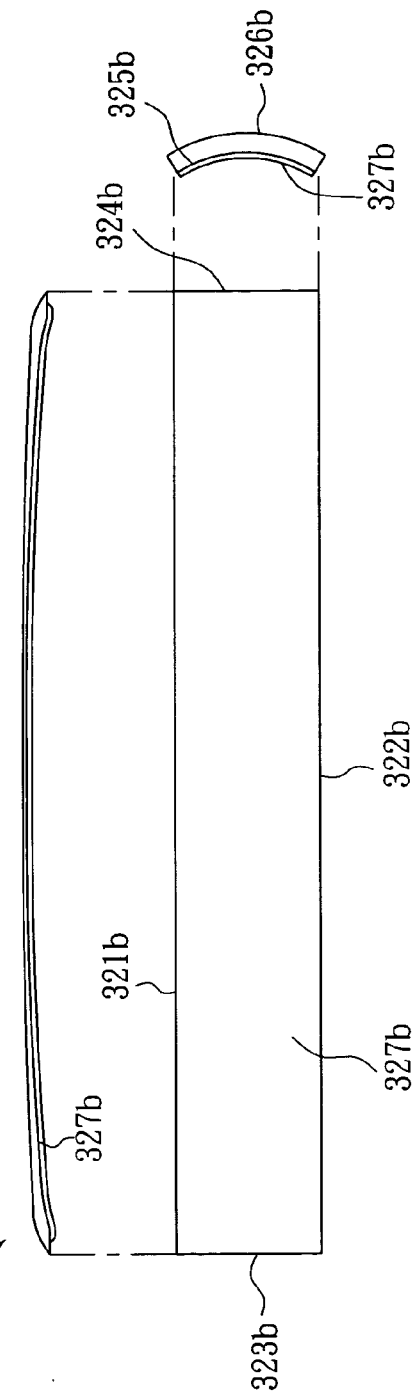
FIG. 3A
FIG. 3B

OPTICAL DEVICE OF SCANNER

CROSS-REFRENCE TO RELATED APPLICATIONS

The present application claims the benefit under 35 U.S.C. § 119 and 37 C.F.R. §1.55 of Taiwanese Application No. 091215035, filed Sep. 10, 2002.

FIELD OF THE INVENTION

The invention relates to a kind of scanner, which may proceed flatbed scanning or paper-feeding scan with automatic document feeder, and which particularly relates to a scanner's optical device that achieves a scanning job without a lens set.

BACKGROUND OF THE INVENTION

Please refer to FIG. 1, which is an embodiment of a typical flatbed optical scanner 1 commonly seen in the current market. Its main structure is that a document window glass 12 is arranged at the upper surface of the casing 11 of a scanner 1 for supporting a document to be scanned (not shown in the figure), and an optical chassis 14 is brought along by a driving device 13 to proceed in linear motion along the direction of a guiding rod 15 in the hollow casing 11, such that an image scanning job is executed for the document placed on the glass 12.

Please refer to FIG. 2, which is the A—A cross-sectional view of the optical chassis 14 of an optical scanner 1 of the prior art shown in FIG. 1. The optical chassis 14 includes: a hollow casing 141, a light source 142 positioned at an appropriate position on the upper surface of the casing 141, a light-guiding device comprised by plural reflective mirrors 143, a lens set 144, and a change coupled device (CCD) 145. The light source 142 first emits light toward the document (not shown in the figure) placed on the glass 12. After the reflected light enters the casing 141 of the optical chassis 14, it is reflected and directionally changed again by plural reflective mirrors 143 of the light-guiding device for increasing its optical length to an appropriate length and, focused by the lens set 144, the reflected light is formed as an image on the charge coupled device 145 that converts the scanned image into electronic signals, and the total track (abbreviated as TT) needed for focusing a clear image is just equal to the total value of Y1+Y2+ . . . +Y6 shown in FIG. 2.

Since the lens set 144 of the prior art optical chassis 14 shown in FIG. 1 and FIG. 2 is comprised of devices, such as convex lens, etc., so the element, the structure, and the assembly all are complicated, and its manufacturing cost is higher, and the lens set 144 will generate light-color separating effect too, such that the scanning quality is influenced and the manufacturing cost is also caused to be increased substantially. The relative businesses that manufacture optical scanners are anxious to solve these problems.

SUMMARY OF THE INVENTION

The main objective of the invention is to provide a scanner's optical device, which applies a light-focusing module for replacing the focusing design of the prior art lens set of an optical scanner, such that the objective of reducing the cost of the prior art scanner may be achieved effectively.

The secondary objective of the invention is to provide a scanner's optical device, which applies the design of a thin film coated on the light-reflective surface of the light-focusing module, such that the color-light separating phenomenon generated from the refraction of glass may be avoided effectively.

In order to reach the said objectives achievable by the scanner's optical device provided by the invention, the optical device of the scanner may receive the light coming from an object being scanned, and the optical device is comprised of several reflective mirrors, a light-focusing module, and a charge coupled device.

The reflective mirror may provide reflection and directional change for the light and, by arranging several reflective mirrors appropriately, the light of the object being scanned may be directionally changed to a predetermined route.

The light-focusing module at least includes: at least one curving mirror and a raster. The curving mirror may focus the light of the predetermined route and then directionally change it, and the raster is provided in the light route of the curving mirror for filtering out unnecessary light.

The charge coupled device may receive the light coming from the light-focusing module and convert it into electronic signals.

In another preferable embodiment of the invention, wherein the reflective mirror is adjustable and, by adjusting the relative positions of the several reflective mirrors, an optical length for proceeding scanning function may be changed, and the several adjustable reflective mirrors are arranged appropriately, such that the light of the image of the object to be scanned is directionally changed to a predetermined route.

For your esteemed reviewing committee to further understand the operational principle and the other function of the invention in a more clear way, a detailed description in cooperation with corresponding drawings is presented as follows.

BRIEF DESCRIPTION OF THE DRAWINGS

FIG. 3A illustrates the upper view, the front view, and the side view of the No. 1 concave mirror according to the invention.

FIG. 3B illustrates the upper view, the front view, and the side view of the No. 2 concave mirror according to the invention.

DETAILED DESCRIPTION OF THE INVENTION

The main characteristic of the optical device of the scanner according to the invention is to give up the lens set that focuses light into image used in the traditional scanner, instead at least one curving mirror being used for proceeding the light to be formed as an image on a charge coupled device that in turn converts the image into electronic signals; furthermore, a raster is cooperated to separate unnecessary light for providing better image quality and, since the invention does not use any lens set, so it has lower cost and advantage of no generation of light-color separating phenomenon.

In order to describe the detailed means, motion manner, achievable function, and other technical characteristic of the invention, several preferable embodiments will be presented as follows.

To describe the technical characteristic and the executing manner of the invention, several executing patterns for the curving mirror and the raster of the invention will be introduced first.

Figure 1:
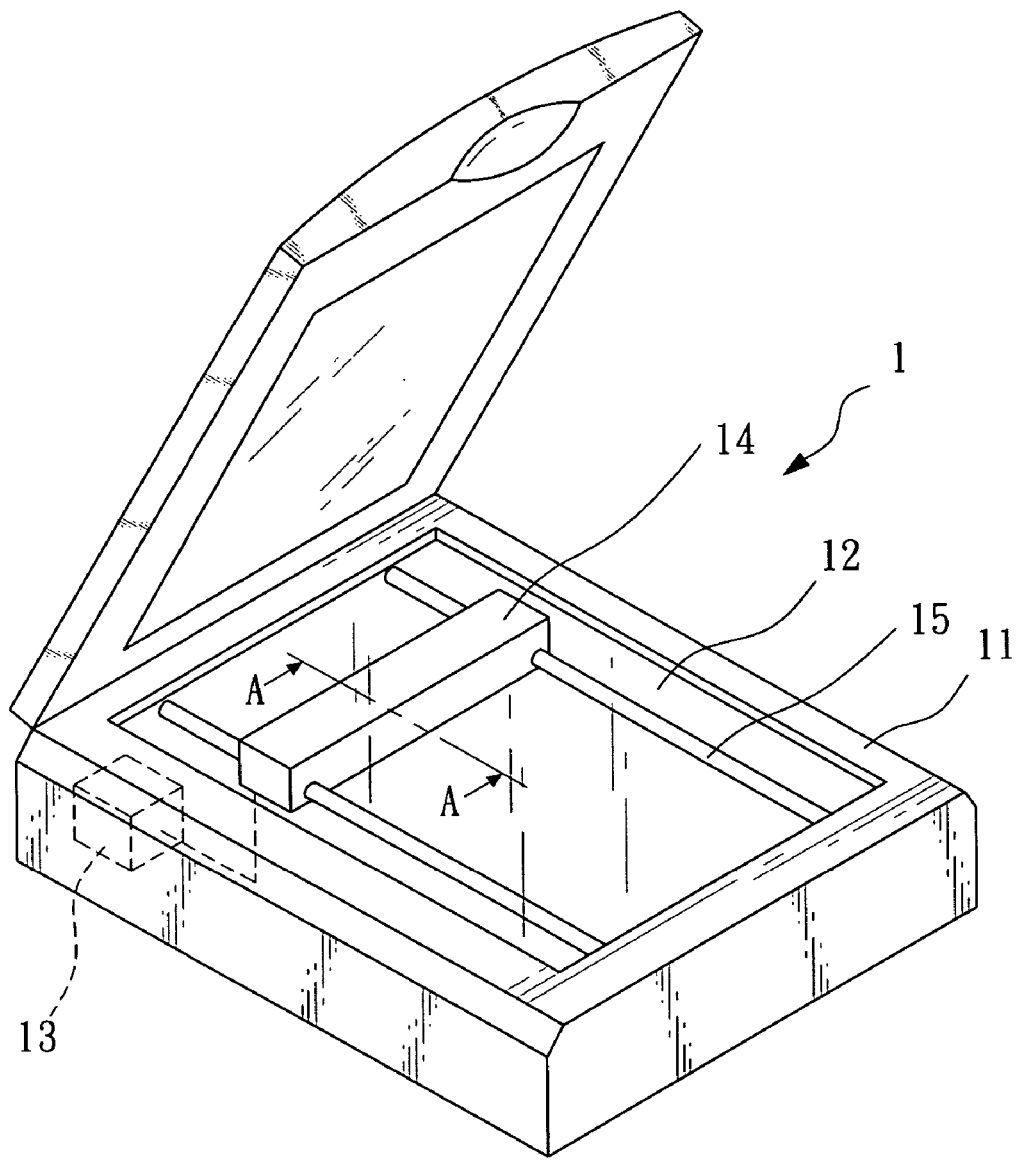
FIG. 1 is an illustration of an optical scanner according to the prior arts.
Figure 2:
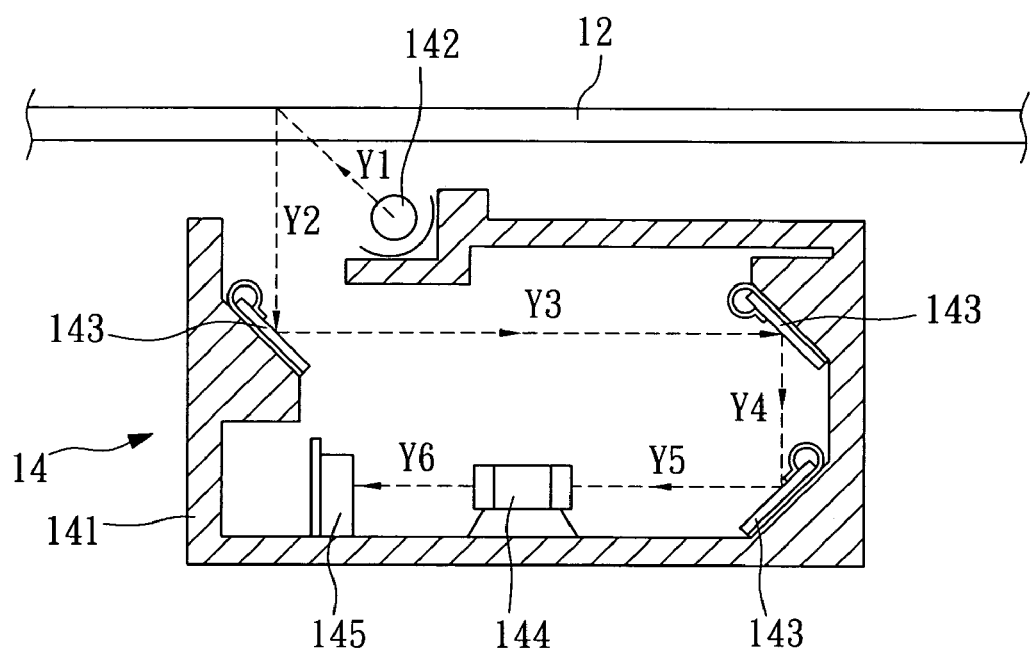
FIG. 2 is an illustration for the light-guiding device inside the optical chassis of the optical scanner according to the prior arts.
Figure 3C:
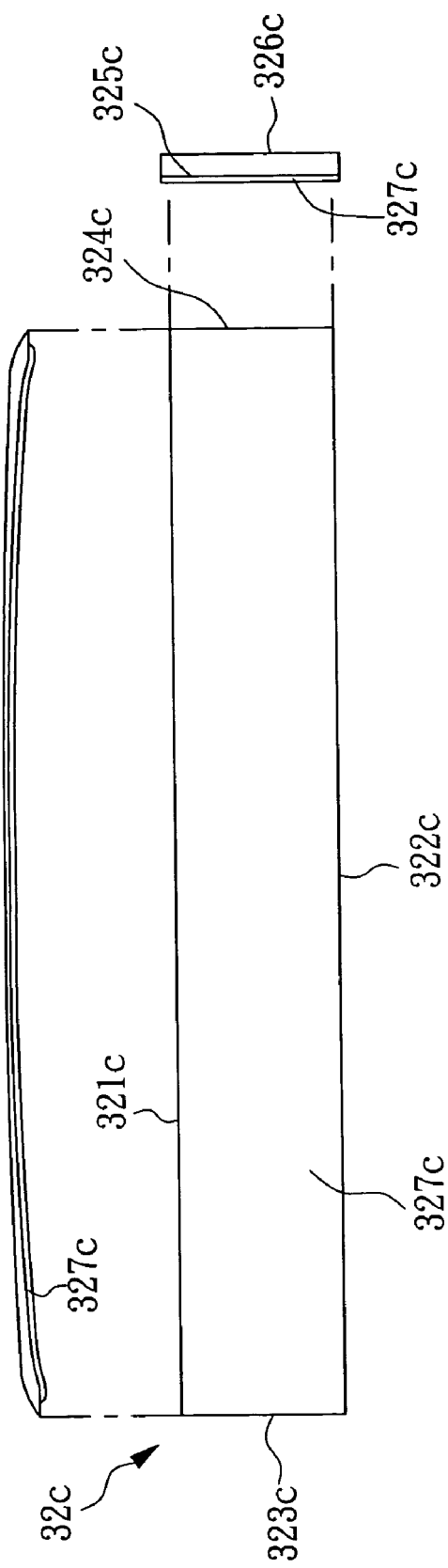
FIG. 3C illustrates the upper view, the front view, and the side view of the No. 3 concave mirror according to the invention.

As shown in FIG. 3A, FIG. 3B, and FIG. 3C, which are three executing patterns for the curving mirrors of the invention: the No. 1 curving mirror 32a, the No. 2 curving mirror 32b, and the No. 3 curving mirror 32c.

As shown in FIG 3A, in which the No. 1 curving mirror 32a has a surface similar to a circular pillar or straight barrel, and the No. 1 curving mirror 32a has two parallel long sides (i.e., the first long side 321a and the second long side 322a), two short sides (i.e., the first short side 323a and the second short side 324a) that are intercrossed with the two long sides, and the two planes (i.e., the first plane 325a and the second plane 326a) that are corresponded to each other and are defined by each long side and each short side respectively. On the No. 1 curving mirror 32a, by bending the two short sides 323a, 324a toward the same side direction and keeping the two long sides 321a, 322a still, it may make the first plane 325a bent inwardly and the second plane 326a projected outwardly, such that the No. 1 curving mirror 32a is formed.

As shown is FIG. 3B, in which the No. 2 curving mirror 32b has a surface similar to a circular ball or elliptical ball, and the No. 2 curving mirror 32b has two parallel long sides (i.e., the first long side 321b and the second long side 322b), two short sides (i.e., the first short side 323b and the second short side 324b) that are intercrossed with the two long sides, and two planes (i.e., the first plane 325b and the second plane 326b) that are corresponded to each other and are defined by each long side and each short side respectively. On the No. 2 curving mirror 32b, by bending the two short sides 323b, 324b and the two long sides 321b, 322b toward a same side direction, it may make the first plane 325b bent inwardly and the second plane 326b projected outwardly, such that the No. 2 curving mirror 32b is formed.

As shown in FIG 3C, in which the No. 3 curving mirror 32c has a surface similar to a circular pillar or straight barrel, and the No. 3 curving mirror 32c has two parallel long sides (i.e., the first long side 321c and the second long side 322c), two short sides (i.e., the first short side 323c and the second short side 324c) that are intercrossed with the two long sides, and two planes (i.e., the first plane 325c and the second plane 326c) that are corresponded to each other and are defined by each long side and each short side respectively. On the No. 3 curving mirror 32c, by bending the two long sides 321c, 322c toward the same side direction and keeping the two short sides 323c, 324c still, it may make the first plane 325c bent inwardly and the second plane 326c projected outwardly, such that the No. 3 curving mirror 32c is formed.

In one preferable embodiment, each curving mirror 32a, 32b, 32c of the invention may be structure as a thin plate made of non-glass and flexible materials, and three coating layers 327a, 327b, 327c made of light-reflective materials are arranged and distributed over the inner curving surfaces of the thin plates (i.e., the first surfaces 325a, 325b, 325c) for providing the function of being a light-reflective surface. Wherein, the light-reflective materials of the coating layers 327a, 327b, 327c may be silver, chromium, aluminum, platinum, or other materials with good light reflectivity, which all may be formed on the thin plate by evaporating sputtering, sputtering, chemical deposition, or other manners, and the thickness of each coating layer 178, 188, 198 may be a single layer or may be multi-layer. Furthermore, the material of the thin plate may be one of the following kinds of materials, such as: paper, plastic, resin, macromolecular polymer, glass fiber, rubber, metallic film, or other non-glass or flexible material. One thing is worth mentioning: the so-called flexible material is not referring to extremely soft material, but a material that should have an appropriate hardness capable of keeping the thin plate itself maintaining enough planarity to reach an excellent effectiveness of light reflection but, subjected to external forces, it still may be bent to a certain degree to constitute the curving mirrors 32a, 32b, 32c with a specific curvature but not being broken and, on the other hand, the flexible materials may also be easily manufactured into different formations relatively, such that its application field may be relatively wider.

Figure 4A:
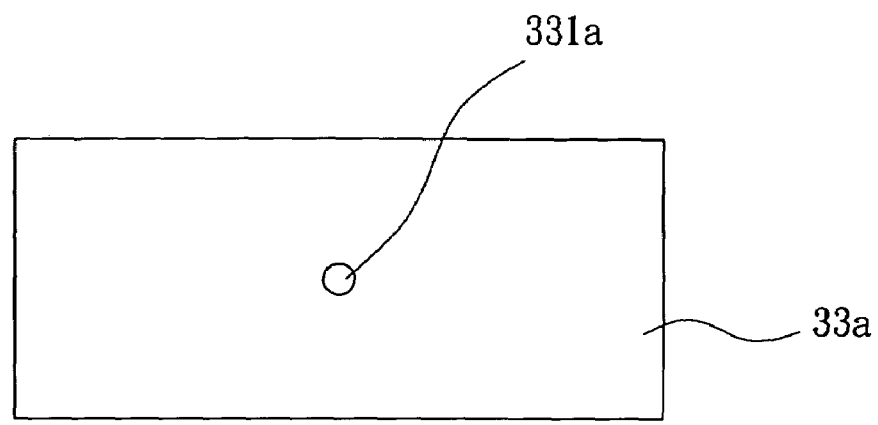
FIG. 4A is an illustration for the first embodiment of the raster according to the invention.
Figure 4B:
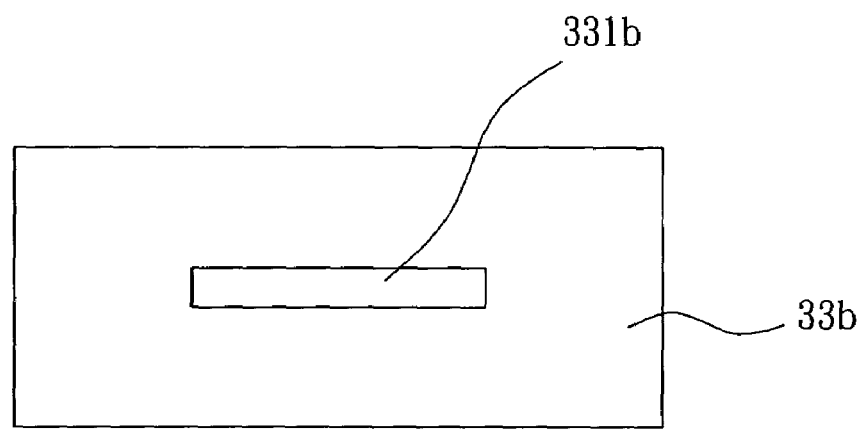
FIG. 4B is an illustration for the second embodiment of the raster according to the invention.
Figure 4C:
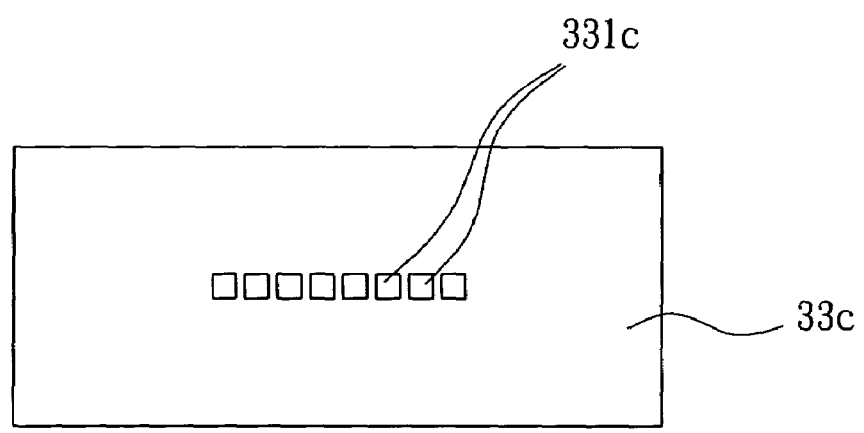
FIG. 4C is an illustration for the third embodiment of the raster according to the invention.

As shown in FIG. 4A, FIG. 4B, and FIG. 4C, which are three illustrations respectively for three different preferable embodiments for the raster according to the invention. In FIG. 4A, the raster 33a has a circular transparent hole 331a, of which the radius is commonly between 2~6 mm preferably. Except the transparent hole 331a, the other part of the raster 33a is necessarily comprised of opaque material. The main reason for restricting the size of the transparent hole 331a is that, if the radius of the transparent hole 331 is too large, then it is impossible to provide excellent separation function for unnecessary light and, if the radius is too small, then it is easy to generate light-diffracting phenomenon, so the side of the transparent hole 331a of the raster 33a must be restricted within a specific range, such that a preferable quality of scanned image may be provided. In FIG 4B, the transparent hole of the raster 33b is a transparent hole 331b shown as a long narrow stripe and extended horizontally. The width (i.e., the narrower side) of this transparent hole 331b shown as a long stripe is commonly between 2~6 mm preferably. In FIG. 4C, the number of the transparent hole 331c of the raster 33c is plural and each transparent hole 331c is shown as a long narrow stripe and extended horizontally, and the width or the radius of each transparent hole 331c is commonly between 2~6 mm preferably.

Figure 5A:
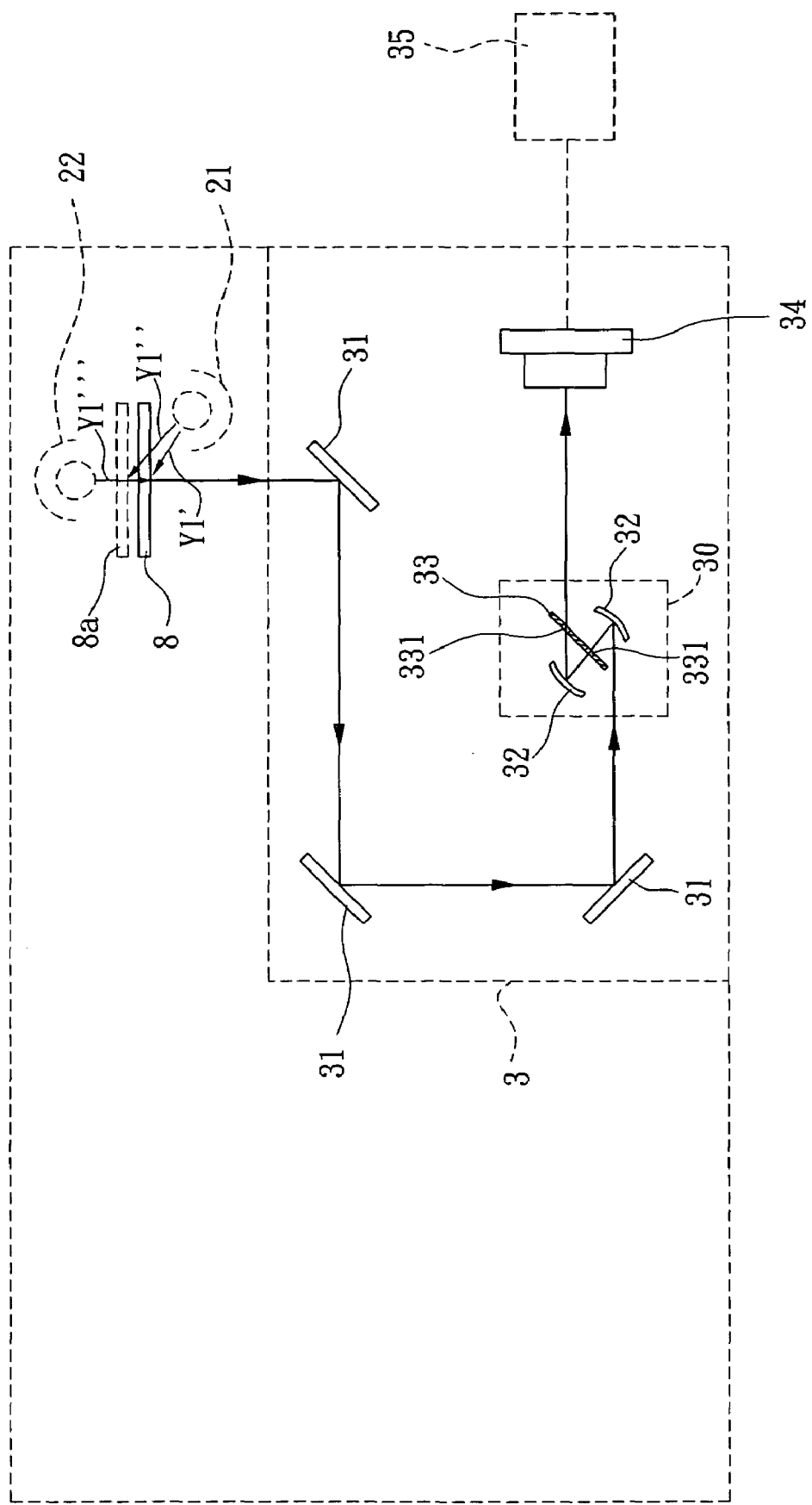
FIG. 5A is an illustration for the first preferable embodiment for the optical route of the optical device of the optical scanner according to the invention.
Figure 5B:
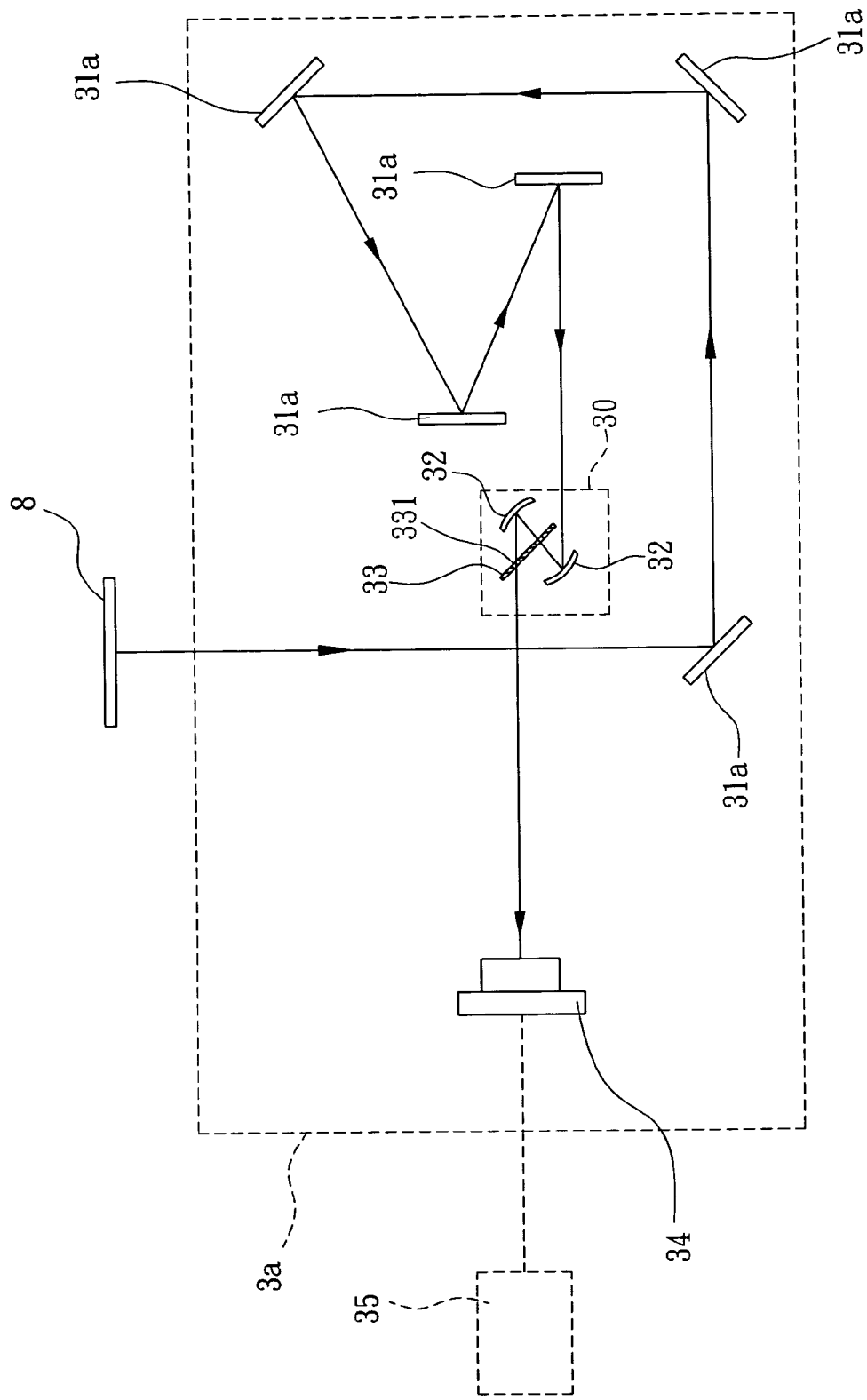
FIG. 5B is an illustration for the second preferable embodiment for the optical route of the optical device of the optical scanner according to the invention.
Figure 5C:
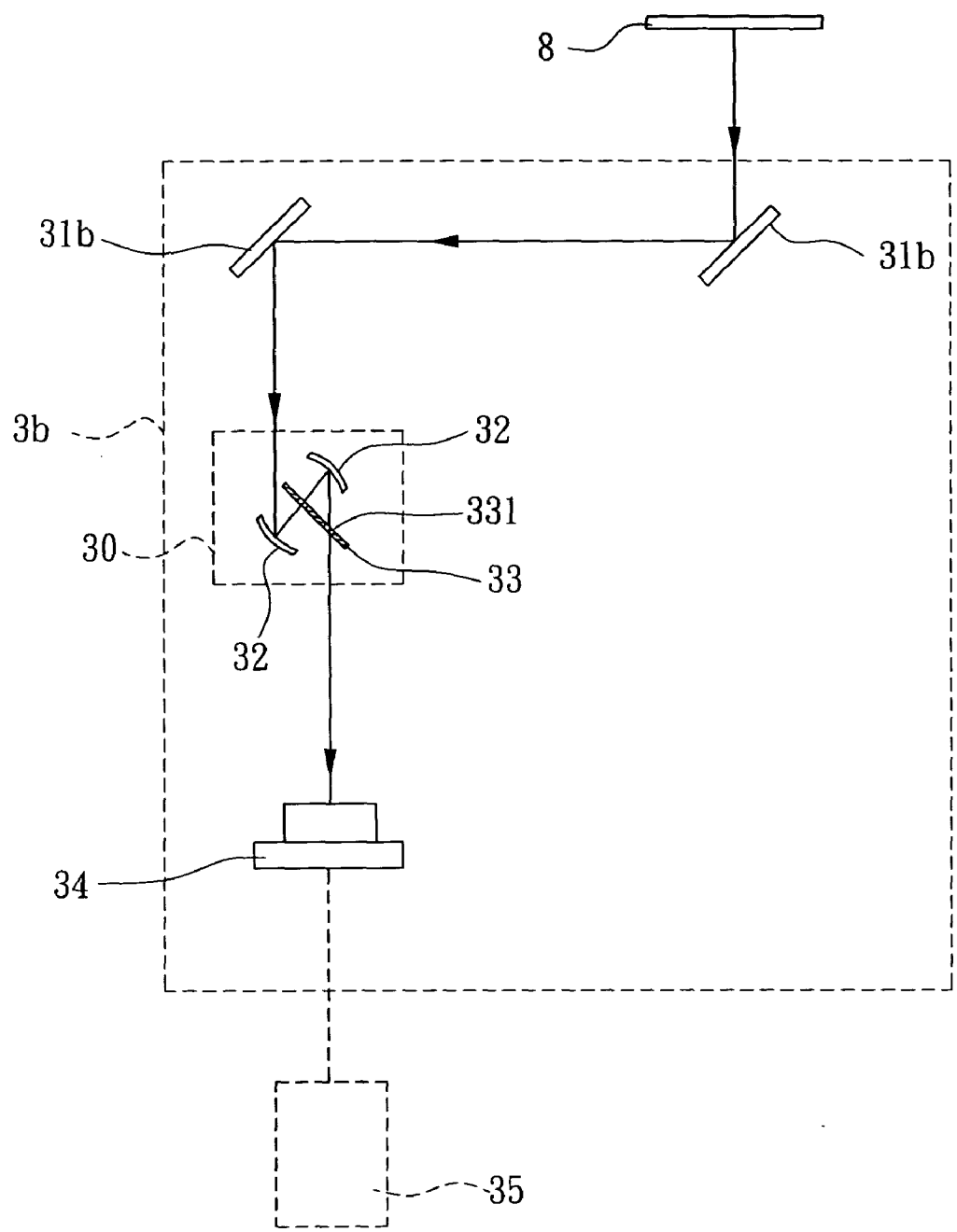
FIG. 5C is an illustration for the third preferable embodiment for the optical route of the optical device of the optical scanner according to the invention.

Please refer to FIG. 5A to FIG. 5C, which are illustrations respectively for several preferable embodiments for the optical route of the optical device of the scanner according to the invention. As shown in FIG 5A, when the optical scanning device 2 of the invention intends to proceed a reflective scanning mode on an object being scanned 8, the light image reflected from the object being scanned 8 enters an optical device 3; at this time, the optical length of the light emitted from the light source 21 and proceeding to the object being scanned 8 is Y1'; when the optical scanning device 2 intends to proceed a paper-feeding scanning mode on an object being scanned 8a, the object being scanned 8a is located a little higher than the position of the original object being scanned 8, so the light emitted form the first light source 21 and incident upon the object being scanned 8a is then reflected from the object being scanned 8a and enters the optical device 3; at this time, the optical length of the light emitted from the first light source 21 and entering the object being scanned 8a is Y1"; when the optical scanning device 2 intends to proceed a transparent scanning mode on an object being scanned 8, a light emitted from a second light source 22, incident toward the object being scanned 8, and penetrating through it enters the optical device 3; at this time, the optical length of the light emitted from the second light source 22 and incident upon the object being scanned 8 is Y1'''.

In the preferable embodiment of the invention, the optical device 3 of a scanner may receive the light of the image coming from an object being scanned 8, wherein the optical device 3 includes: several reflective mirrors 31, a light-focusing module 30, and a charge coupled device 34. The reflective mirror 31 is provided for reflecting and directionally changing the light and, through appropriately arranging the several reflective mirrors 31, the light of the image of the object being scanned 8 is directionally changed to a predetermined route. With at least one curving mirror 32, the light-focusing module 30 focuses the light of the predetermined route and directionally changes it to the charge coupled device 34, which receives the light directionally changed by and coming from the light-focusing module 30 and converts it into electronic signals, and the light-focusing module 30 further has a raster 33, which is located in the optical route of the curving mirror 32 and is applied for filtering out the unnecessary light.

In the preferable embodiment shown in FIG. 5A, the arranging manner of the optical path is to apply three reflective mirrors 31 to proceed reflection and directional change to the light of the image coming from the object being scanned 8 to be guided to a predetermined route, and the optical length is thereby elongated, while the reflective mirror 31 has no light-focusing function. The difference between the preferable embodiment of FIG. 5B with that of said FIG. 5A is that: this embodiment applies more pieces (five pieces) of reflective mirror 31a and appropriate design of an optical route to obtain an optical device 3a with smaller volume under the condition of equal total track; while the difference between the preferable embodiment of FIG. 5C with that of said FIG. 5A is that: this preferable embodiment applies less pieces (two pieces) of reflective mirror 31b and appropriate design of an optical route to make the optical device 3b formed into a three-dimensional structure.

In this preferable embodiment of the invention, the number of the curving mirror 32 of the light-focusing module 30 is two. One is used to receive the light image transferred from the predetermined route, focus it, and then transfer it again. The other one transfers the light focused and transferred by the said mirror 32 to the charge coupled device 34. In this preferable embodiment, both the curving mirrors 32 have same curvature respectively. Of course, in order to enhance the brilliance of the scanned image, it may also be possible to design these two curing mirrors 32 into two curving mirrors 32 that have different curvatures respectively, while the raster 33 is located in an optical route that may be between the charge coupled device 34 and the curving mirror 32, the reflective mirror 31 and the curving mirror 32, or the curving mirror 32 and the curving mirror 32, etc. In the preferable embodiment, the transparent hole 331 of the raster 33 is located in the optical route at the position of the neighborhood of the focusing point, such that a better function for filtering unnecessary light is provided. When different scanning modes are undertaken, the scanning quality will be influenced because of the different optical lengths such as Y', Y", or Y''' so, preferably, the optical device 3 may further be arranged with an image adjustable module 35, such that the light image focused by the curving mirror 32 may be calibrated and adjusted. Of course, by designing the reflective mirror 31 to be adjustable, the relative positions of the several reflective mirrors 31 may be adjusted for changing an optical length of a scanning procedure. The several adjustable reflective mirrors 31 have been arranged appropriately, such that the light of the image of the object being scanned 8 is directionally changed to a predetermined route.

Figure 6:
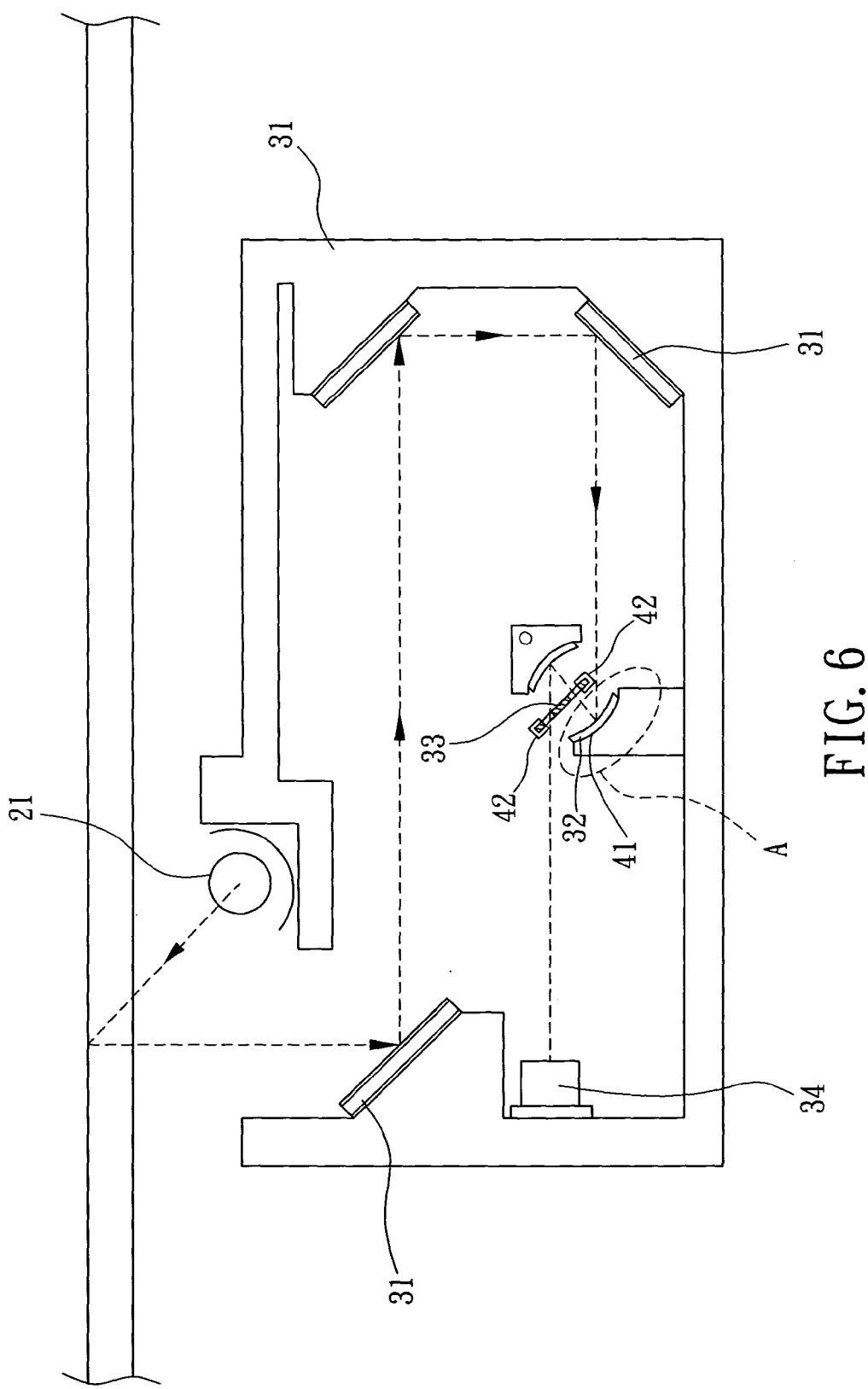
FIG. 6 is an illustration for a preferable embodiment for the connecting structure between the casing and the concave mirror of the optical device according to the invention.
Figure 7:
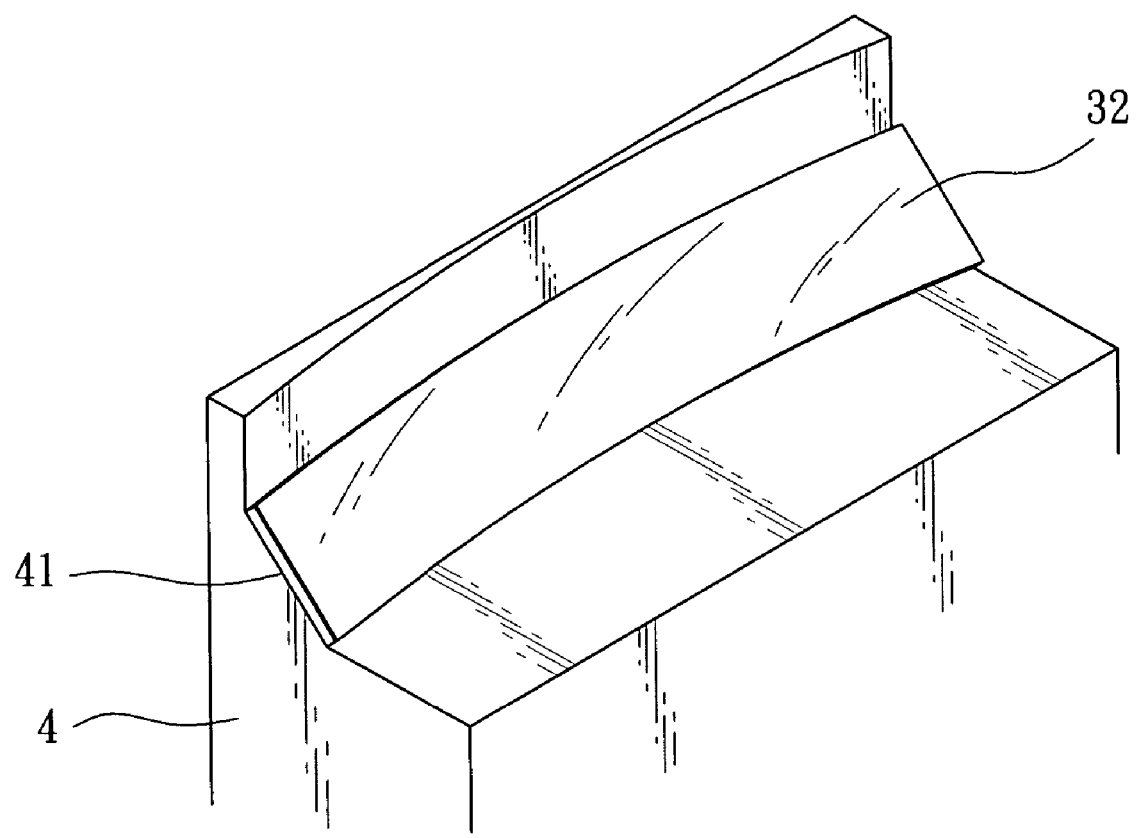
FIG. 7 is a partially enlarged 3-D illustration for the A zone shown in FIG. 6.

Please refer to FIG. 6 and FIG. 7, which illustrate a preferable embodiment for the connecting structure between the casing and the concave mirror of the optical device according to the invention. The optical device 3 of the invention is further comprised of a casing 4 available for accommodating and positioning the reflective mirror 31, the light source 21, the light-focusing module 30, and the charge coupled device 34. Furthermore, several connecting surfaces 41 are formed with corresponding predetermined angles and positions at the predetermined positions on the side surfaces in the casing 4 for providing the connecting and positioning functions to the curving mirror 32 and the reflective mirror 31. Additionally, the connecting surface 41 is designed as a curving formation with appropriate curvature for matching the curving outer appearance of the curving mirror 32, such that the curving mirror 32 may be directly accommodated and positioned in the connecting surface 41. As described therein before, since the curving mirror 32 may be preferably comprised of a flexible material, so it may be connected and combined on the connecting surface 41 by any direct connecting method to comprise the curving mirror 32, and an open groove 42 may be further arranged for accommodating the raster 33. Therefore, when the optical device 3 is assembled, it may just directly paste and position the light-reflective element formed as thin plate that is manufactured by flexible materials and is coated with light-reflective layer onto the connecting surface 41 formed as curving surface in the casing 4, so the structure of the curving mirror 32 may be directly formed with very easy, time-saving procedure and low cost. Furthermore, it is very easy to machine, bend, or design the flexible thin-plated structure made of non-glass materials into a light-reflective device with curving surface or irregular shape available for special requirement.

What is claimed is:

1. A scanner's optical device capable of receiving light coming from an object being scanned, comprising:

several reflective mirrors, capable of providing reflection and directional change for the light and, wherein by arranging several reflective mirrors appropriately, the light of the object being scanned is capable of being directionally changed to a predetermined route;

a light focusing module, comprising:

at least one curving mirror, capable of focusing the light of the predetermined route and then directionally changing it;

a raster, which is provided in the light route of the curving mirror for filtering out unnecessary light; and a charge coupled device, capable of receiving the light coming from the light-focusing module and converting it into electronic signals.

2. The scanner's optical device according to claim 1, wherein the raster has at least one transparent hole.

3. The scanner's optical device according to claim 2, wherein the transparent hole is formed as a long narrow stripe and extended horizontally.

4. The scanner's optical device according to claim 2, wherein a number of the transparent hole is plural and the transparent hole is formed as a long narrow stripe and extended horizontally.

5. The scanner's optical device according to claim 1, wherein the curving mirror has two parallel long sides, two short sides that are intercrossed with the two long sides respectively, and a first plane and a second plane that are corresponded to each other and defined by the long sides and the short sides.

6. The scanner's optical device according to claim 5, wherein the two short sides are bent to form a curving mirror with the first plant bent inwardly and the second plane projected outwardly.

7. The scanner's optical device according to claim 5, wherein the two long sides are bent to form a curving mirror with the first plant bent inwardly and the second plane projected outwardly.

8. The scanner's optical device according to claim 5, wherein the two long sides and the two short sides are bent to a same side direction simultaneously to form a curving mirror with the first plant bent inwardly and the second plane projected outwardly.

9. The scanner's optical device according to claim 1, wherein the optical device further has an image adjusting module, applied to calibrate and adjust the light image focused by the light-focusing module.

10. The scanner's optical device according to claim 1, wherein one or more of the at least one curving mirror is at least partially structured as a thin plate, of which one side surface is arranged and distributed with a coating layer of light-reflective material.

11. The scanner's optical device according to claim 10, wherein the coating layer is arranged and distributed on the inner curving surface of the curving mirror.

12. The scanner's optical device according to claim 1, wherein the optical device further has a casing applied for accommodating and positioning each reflective mirror, the light-focusing module, and the charge coupled device; furthermore, several connecting surfaces that are corresponded with each other with predetermined angles and positions are formed on the predetermined positions of the casing for providing a connecting and positioning function to the at least one curving mirror.

13. The scanner's optical device according to claim 12, wherein the connecting surface is designed as a curving surface formation that matched with the curvature of the curving appearance of the curving mirror, such that the curving mirror is capable of being accommodated and positioned directly in the connecting surface.

14. The scanner's optical device according to claim 12, wherein the curving mirrors are comprised of flexible materials and are pasted directly in the connecting surface.

15. The scanner's optical device according to claim 12, wherein a number of the curving mirror is plural.

16. The scanner's optical device according to claim 1, wherein the plural curving mirrors all have the same curvature.

17. The scanner's optical device according to claim 1, wherein the plural curving mirrors have at least two different kinds of curvature.

18. The scanner's optical device according to claim 1, wherein the reflective mirrors are capable of being adjustable and, by adjusting the relative positions of the several adjustable reflective mirrors, it is capable of changing an optical length of a scanning procedure and, by appropriately arranging the several adjustable reflective mirrors, the light of the image of the object being scanned is capable of being directionally changed to a predetermined route.

* * * * *

UNITED STATES PATENT AND TRADEMARK OFFICE
CERTIFICATE OF CORRECTION

PATENT NO. : 7,242,502 B2
APPLICATION NO. : 10/664936
DATED : July 10, 2007
INVENTOR(S) : Yin-Chun Huang et al.

It is certified that error appears in the above-identified patent and that said Letters Patent is hereby corrected as shown below:

On the Title Page, Item (30)
(Foreign Application Priority Data): Delete "Sep. 24, 2002" and replace with --Sep. 10, 2002--;

Column 1, line 3: Delete "REFRENCE" and replace with --REFERENCE--;

Column 7, line 23 (Claim 6): Delete "plant" and replace with --plane--;

Column 7, line 27 (Claim 7): Delete "plant" and replace with --plane--;

Column 7, line 32 (Claim 8): Delete "plant" and replace with --plane--;

Signed and Sealed this

Second Day of November, 2010

David J. Kappos
*Director of the United States Patent and Trademark Office*